(12) United States Patent
Paul et al.

(10) Patent No.: US 8,633,147 B2
(45) Date of Patent: Jan. 21, 2014

(54) MODIFIED SILICONE POLYMER AS ANTI FOAM AGENT AND DETERGENT COMPOSITION HAVING THE SAME

(75) Inventors: Amit Kumar Paul, Kolkata (IN); Kalon Chatterjee, Kolkata (IN); Ayndrila Dutta, Kolkata (IN)

(73) Assignee: Wacker Chemie AG, Munich (DE)

( * ) Notice: Subject to any disclaimer, the term of this patent is extended or adjusted under 35 U.S.C. 154(b) by 104 days.

(21) Appl. No.: 13/321,470

(22) PCT Filed: May 19, 2009

(86) PCT No.: PCT/EP2009/056058
§ 371 (c)(1),
(2), (4) Date: Nov. 18, 2011

(87) PCT Pub. No.: WO2010/133249
PCT Pub. Date: Nov. 25, 2010

(65) Prior Publication Data
US 2012/0065118 A1   Mar. 15, 2012

(51) Int. Cl.
*C11D 9/36* (2006.01)
(52) U.S. Cl.
USPC ............ 510/347; 510/276; 510/343; 510/466
(58) Field of Classification Search
USPC .................................. 510/276, 343, 347, 466
See application file for complete search history.

(56) References Cited

U.S. PATENT DOCUMENTS

| | | | |
|---|---|---|---|
| 2,917,480 A | 12/1959 | Bailey et al. | |
| 3,600,418 A | 8/1971 | Bailey et al. | |
| 3,865,544 A | 2/1975 | Keil | |
| 4,637,890 A | 1/1987 | Crabtree et al. | |
| 4,894,117 A | 1/1990 | Bianchi et al. | |
| 5,431,853 A * | 7/1995 | Tsuda et al. | 516/118 |
| 5,556,902 A * | 9/1996 | Shouji et al. | 516/117 |
| 6,417,258 B1 * | 7/2002 | Aoki et al. | 524/266 |
| 2004/0122113 A1 * | 6/2004 | Zeng | 516/124 |

FOREIGN PATENT DOCUMENTS

| | | |
|---|---|---|
| CN | 101392097 A | 3/2009 |
| EP | 0254499 A2 | 1/1988 |
| EP | 0254499 B1 | 9/1993 |

OTHER PUBLICATIONS

Dalet, Pierre, International Search Report dated Jan. 1, 2010, for PCT Application No. EP2009/056058.
English PatBase Abstract corresponding to CN 101392097 A.

* cited by examiner

*Primary Examiner* — Charles Boyer
(74) *Attorney, Agent, or Firm* — RatnerPrestia

(57) ABSTRACT

A modified silicone polymer as an anti foam agent, its preparation and detergent formulations involving selective organopolysiloxane antifoam composition/agent for use as fabric wash detergent adapted for excellent antifoaming effect in rinsing cycle with preferred defoaming effect in washing cycles. The anti foam agent for detergent formulations and the like is directed to not only save huge amount of waste water but also help to preserve massive amount precious clean water for desirable favorable use and application. It would provide for detergent formulations and the like which would favor both the washing and rinsing cycles and make washing of clothes/fabrics more convenient and user friendly apart from taking care of avoiding unnecessary wastage of valuable water and saving the environment from unnecessarily wastage of water in hand wash and/or semi automatic machine washing and the like.

16 Claims, No Drawings

MODIFIED SILICONE POLYMER AS ANTI FOAM AGENT AND DETERGENT COMPOSITION HAVING THE SAME

CROSS REFERENCE TO RELATED APPLICATIONS

This application is the national phase filing of international patent application No. PCT/EP2009/056058, filed 19 May 2009, the entirety of which application is incorporated herein by reference.

FIELD OF THE INVENTION

The present invention relates to a modified silicone polymer as an anti foam agent, its preparation and detergent formulations involving such selective organopolysiloxane antifoam composition/agent for use as fabric wash detergent adapted for excellent antifoaming effect in rinsing cycle while preferred defoaming effect in washing cycles.

The present invention is thus directed to not only save huge amount of waste water but also help to preserve massive amount precious clean water for desirable favourable use and application. Advantageously, therefore the present invention in other words is in the line of green water balance targeted to reduce pollution and save the world from future massive climatic disasters or ecological imbalances.

BACKGROUND OF THE INVENTION

Globally, many people clean fabrics by hand washing or machine-assisted hand washing with compositions containing soap and/or detergent. Machine-assisted hand washing of fabrics involves the use of a manual or semi-automatic wash machine with completion of the wash process and later, rinse the fabrics by bucket or in machine spinner.

In the normal washing process, water is taken in a bucket or in fabric's soaking container or washing tub of semi automatic machine. Thereafter, desired quantity of detergent is added to generate lather by hand shaking or run for a while the washing tub in semi-automatic machines. This is followed by immersion of the dirt fabrics for soaking for 10 to 30 min. After soaking period, the fabric is rubbed by hand to remove dirt or the washing cycle is run for 10 to 20 min in case of semi-automatic machines.

For rinsing, the dirt water is drained out and by squeezing the dirt water is removed from fabrics. Thus each such rinsing cycle consists of squeezing the fabrics and washing the fabrics with fresh water. Such rinsing cycle is repeated for four to five times for hand wash or in case of semi automatic machine, four to five times rinse cycle is followed to remove all foams before final spinning.

Effective hand wash detergent compositions comprise anionic surfactants, particularly alkylbenzene sulfonate and alkyl sulfate surfactants. It has also been found beneficial for the appearance and cleaning of fabrics for hand wash laundry detergents to contain an amount of a cellulase enzyme sufficient to improve the appearance and cleaning of such fabrics, particularly after multiple cleaning cycles. But this anionic surfactant is important for cleaning and cheap source of generating substantial foam in the washing even at small amount.

Globally, water pollution and water conservation are serious concerned specially in the developed and underdeveloped countries. In Asia, countries like India, China, Indonesia, Thailand, Vietnam more than 80% people wash their cloths by hand. In Latin America, countries like Brazil, Colombia, Venezuela and Argentina more than 70% people follow hand washing to clean their cloths. Hand washing of cleaning the cloths is also predominating in Eastern Europe and Africans countries. During cleaning of fabrics by hand washing or by semiautomatic machine, huge amount of clean water is used during the rinsing where rinsed water contains ppm level of detergent. The ppm level of residual detergent doesn't make any discomfort during the use of washed garments/cloths in real life but it is a human way of mind to believe that generation of foam during rinsing means dirt detergent is still entrapped in the clothes and more washing is necessary. So, user continues rinsing till rinsing liquor free from foam by following a standard rinsing sequence by hand washing in an order of rinsing the fabrics first, followed by squeezing the fabrics and draining out the rinsed water and again following the same cycle. At the end of washing, it is estimated that an excess of 50% or more water is drained out as a waste water which not only generates huge amount of waste water but also is unnecessarily use up fresh water for such rinsing only due to foam generation. On the other hand, it is clear that we are not only draining out the water but also draining out a huge amount of money for waste water treatment and also spending money to generate fresh water. Moreover, un-necessary use of valuable water for such hand washing/purposes is social evil in the country or region where scarcity of fresh water is massive.

On the other hand, detergent used in hand washing/semi-automatic machine wash, must have preferred foaming in nature during the soaking and washing process. It is important due to the fact of traditional concept of no foam means not a good detergent. So, all detergent manufacturers have a common requirement of foaming during washing and no foaming during rinsing that claims of saving cost and water of such kind of detergent.

In general, for foaming and de-foaming, two types of chemicals are available. Chemicals having defoaming activity has a mechanism to reduce foam or no foam when use in a liquid or solid and other types of chemicals having foaming tendency generate huge foam during the use in its application.

Attempts have been made in the past to resolve this problem by secondary method, called single rinse concept where during rinsing cycle, use a defoamer containing fabric conditioner where fabric conditioner conditioned the fabric at rinsing cycle and in addition kills the all residual foam. This concept was not very much successful in case of hand washing process, since use of fabric conditioner in this class is considered to be a luxury and people of hand-washing segment uses hand washing due to money constraint for fabric cleaning.

Considering the wastage of water and cost of normal detergent used in hand wash or semi-automatic machine, there has been the need for detergent formulations which when used for washing fabrics and the like would generate preferred amount of foaming during washing cycle without affecting the cleaning nature of the detergent but also have defoaming activity in rinsing cycle so that one or two rinse is enough to clean the fabric. It is however extremely difficult to provide for such characteristics in detergent formulations and the like which would favour both the washing and rinsing cycles and make washing of clothes/fabrics more convenient and user friendly apart from taking care of avoiding unnecessary wastage of valuable water and saving the environment from unnecessarily wastage of water in hand wash and/or semi automatic machine washing and the like. It is also important that such advancement directed to washing formulations adapted for effective washing avoiding wastage of water is attended at cost-effective rates since the market is very much price sensitive and the success of new detergent heavily depend on cost as well.

U.S. Pat. No. 4,637,890 disclosed a detergent composition that acts as defoamer in rinsing cycles. Detergent composition revealed a composition for suds/foams controlling prills comprising fatty acid soap, quaternary ammonium salt and silicone fluid for suds suppresser. It is indicated in the patent that the prills dissolve in the relatively high pH (from 9 to 10.5 pH) in washing cycles and prills are not active at high pH. Prills become active to suppress suds at low pH with a concept of lower pH at rinsing cycles where detergent contained less in rinsed water. However, the examples didn't direct to any actual applications and additionally it was not clear whether the detergent was effective in hand washing or machine-assisted hand washing. It is understood from the disclosure that effectiveness of suppressing foam by silicone defoamer was highly dependent on prills formation with the help of fatty acid soap and quaternary ammonium compound. According to the disclosure a normal silicone fluid (alkylated polysiloxane) used as defoamer where normal silicones defoaming activity was controlled in washing cycle by way of insolubility of prills at alkaline pH.

U.S. Pat. No. 4,894,117 disclosed a composition of agglomerated granules for the delay release of antifoaming agent in laundry system. It relates to a laundry detergent composition comprising silicone antifoam adsorbed on a powdered water soluble carrier selected from modified cellulose carriers which is subsequently agglomerated into granular form by mixing in presence of a solvent for the carrier. This prior art disclosed a series of granulated laundry additives wherein standard silicone antifoam were encapsulated. These different granulated laundry additives have different silicone antifoam release time depending on type of cellulose used and size of the granules. It is clearly apparent that such type encapsulated laundry additive is only suitable for machine wash but totally not suited in case of hand washing or machine-assisted hand washing since time of washing would vary from one user to another, one region to another region and one country to another country. Thus while a detergent composition having laundry additive granules with encapsulated silicone antifoam may be acceptable to one user but not suited to the requirement of another user due to different washing time where user can see no foam in washing cycles due to longer washing time or more water used in rinsing cycle due to shorter washing time since particular granules used in the detergent for washing would have a fixed time for releasing encapsulated silicones. According to the disclosure conventional silica filled polydimethyl siloxane used as defoamer to make encapsulated defoamer granules.

EP 254 499 B1 disclosed a method for the preparation of a silicone defoamer composition, said method comprising heating a mixture comprising
a blend of organopolysiloxanes (1) and (2)
(3) silanes or their partial hydrolysis condensates or siloxane resins,
(4) finely divided filler, preferably silica,
(5) reaction catalyst, preferably KOH,
(6) compounds like alkylene glycols, polyhydric alcohols, carboxylic acids and their esters, nonionic surfactants, polyoxyethylene anionic surfactants, polyether-modified silicones, nonionic fluorinated surfactants and OH-containing polymeric compounds like hydroxyethylcellulose.

A silicone defoamer composition is obtained by reacting a blend of trimethylsilyl-terminated polydimethylsiloxane and silanol-terminated polydimethylsiloxane with polyoxyethylene-polyoxypropylene copolymers and with silica.

The defoaming activity of the composition is disclosed but neither the use in a detergent composition is described nor can it be used as a delay defoamer by permitting foaming during the washing stage but inhibiting foaming during rinsing operations.

It is clear from the above state of the art that all such related arts depend on encapsulation of silicone or silicone defoamer where both the type of chemicals have strong antifoaming action.

The activity of delay defoamer or suppression of suds in rinsing cycles is dependent on many other parameters as discussed above. Therefore, application of such type of available defoamers is only possible in systematic washing system like machine wash but impossible to work in hand washing or machine-assisted hand washing because of wide variation of washing habit from one user to another user. On the other hand, any product that works in hand washing or machine-assisted hand washing, obviously performs better in all automated machine wash.

It is thus the basic object of the invention to develop modified organopolysiloxane based delay defoamer compounds/formulations that would easily mix with hand wash or semi automatic detergent and on one hand have no effect on detergency and preferred foaming nature of the detergent during washing cycle while on the other hand would provide excellent defoaming activity in the rinsing cycle.

Another object of the present invention is directed to provide a modified organopolysiloxane based delay defoamer compounds/formulations which will favour saving huge amount of fresh water and reduce the wastage of valuable water required in hand wash detergent or semiautomatic machine detergent applications for cloth/fabric washing.

Another objective of the present invention is directed to selective provision of modified organopolysiloxane based delay defoamer compounds/formulations for use in detergent formulation which would favour obtaining the much desired detergent formulation with advancement directed to washing formulations adapted for effective washing avoiding wastage of water at cost-effective rates.

Another objective of the present invention is directed to synthesize modified organopolysiloxane based delay defoamer compounds/formulations in simple way to optimise the cost of the organopolysiloxane compound that would have minimum impact in the formulation cost of final detergent.

Yet another object of the present invention is directed to a detergent composition/agent with excellent anti-foaming effect during rinsing while generate preferred foaming in washing cycle.

SUMMARY OF THE INVENTION

Thus according to the basic aspect of the present invention there is provided a modified silicone polymer as an anti foam agent comprising:
a reaction product of hydroxyl/alkoxy ended organopolysiloxane and/or organocyclosiloxane or organopolysiloxane or mixtures thereof
with a reactive organic compound comprising an alkylene group wherein one end of the alkylene group is capped with reactive groups preferably selected from carboxylic group, carboxylic anhydride, epoxide and lactones
and the other end of the alkylene group is linked directly with one side of a poly oxyalkylene chain via ether link or ester link
and the other side of same poly oxyalkylene chain is capped with alkyl groups or aryl groups or alkyl aryl groups via ether link or ester link,
wherein the alkyl group having 1 to 30 carbon atoms, preferably 1 to 10 carbon atoms, the aryl group having 6 to 35 carbon atoms, preferably 6 to 20 carbon atoms, the aryl group having 7 to 35 carbon atoms, preferably 7 to 20 carbon atoms, the alkylene group having 2 to 20 carbon atoms and most preferable alkylene groups are ethylene, propylene, butylene, pentylene and up to octylene groups with different isomeric forms, wherein in the poly oxyalkylene chain the alkylene groups may vary from ethylene to octylene group and also other form of isomers of said alkylene group and most preferable oxyalkylene groups are oxyethylene, oxypropylene and oxyisopropylene, the number of the repeating unit of the oxyalkylene groups may vary from 2 to 20 but most preferably from 2 to 5.

The oxyalkylene groups present in the organic compound may have similar unit/s or mixture of different alkylene groups.

DETAILED DESCRIPTION OF THE INVENTION

In accordance with a preferred aspect of the invention the modified silicone polymer as an anti foam agent comprising one or more of:

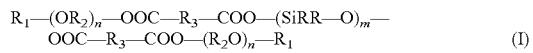

(I)

or

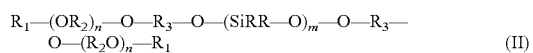

(II)

where R, $R_1$ can be alkyl group or aryl group or alkyl aryl group the alkyl group having 1 to 30 carbon atoms, preferably 1 to 10 carbon atoms, the aryl group having 6 to 35 carbon atoms, preferably 6 to 20 carbon atoms, the aryl group having 7 to 35 carbon atoms, preferably 7 to 20 carbon atoms;

$R_2$ can be alkylene group having 2 to 8 carbon atoms, preferably 2-3 carbon atoms;

$R_3$ can be alkylene group having 2 to 20 carbon atoms, preferably 2-8 carbon atoms;

m, n are positive integers where n may vary from 2 to 20 and preferably from 2 to 5 and m may vary from 20 to 1000 and preferably from 30 to 500.

In accordance with another aspect of the invention there is provided an organopolysiloxane anti foam composition comprising modified silicone polymer and a carrier filler wherein the ratio of said silicone polymer carrier filler comprise 5-30:70-95 respectively.

In the above organopolysiloxane anti foam composition the carrier filler comprises inorganic salts, organic solid powders compatible with different detergent formulations preferably selected from sodium carbonate, sodium sulphate and the alike.

Also in the organopolysiloxane anti foam composition the ratio of said silicone polymer and carrier filler preferably comprises 8-25:92-75.

In accordance with yet another aspect of the present invention there is provided a detergent composition having the organopolysiloxane anti foam composition/agent as disclosed above comprising said defoamer composition/agent incorporated in standard detergent preferably with the ratio of the defoamer composition/agent:standard detergent in the range of 10-0.005:90-99.95 more preferably 4.0-0.1:96-99.9.

Another aspect of the invention is directed to a process for the manufacture of modified silicone polymer as an anti form agent comprising:

reacting said hydroxyl/alkoxy ended organopolysiloxane and/or organocyclosiloxane or organopolysiloxane or mixture thereof with said reactive organic compound in the presence of an alkaline catalyst/an acid catalyst at 90° C. to 170° C. under vacuum and in the absence of silica;

neutralizing the polymer by silyl phosphate or with other acidic compounds in case of alkaline catalyst or with basic compound in case of acid catalyst to destroy effectiveness of the catalyst;

increasing the fluid temperature to in-between 140° C. to 200° C. under vacuum;

stripping out the volatiles content from the polymer; and finally cooling the polymer to room temperature free of the volatile contents.

Preferred hydroxyl ended organopolysiloxanes are those of the general formula

(III)

where R and m are as defined above.

Preferred reactive organic compounds are those of the general formula

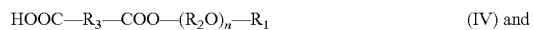

(IV) and

(V)

where $R_1$, $R_2$, $R_3$ and n are as defined above.

The alkaline catalyst used in the process comprises of lithium, sodium, potassium, rubidium or cesium or quaternary compounds in form of oxide or hydroxide, most preferably sodium, potassium, cesium or tetramethylammonium hydroxide.

The acid catalyst used in the process comprises halo acids or sulphuric acid or similar alike in the form acid itself or adsorb in any inert compound like clay.

In accordance with a preferred aspect of the invention in the process preferably 110° C. to 170° C. temperature is set to complete the reaction in-between silicone polymer and reactive organic compound and the fluid temperature is increased preferably to in-between 150° C. to 200° C. to strip out volatile from the polymer.

The ratio of the siloxane and the reactive organic compound may vary from 99.0:1.0 to 80:20 and most preferably 90:10.0 to 99:1.0.

In accordance with yet another aspect of the invention there is provided a process for the manufacture of the modified organopolysiloxane based delay anti foam/defoamer composition as above comprising:

(i) providing said modified silicone polymer;

(ii) mixing the (i) modified silicone polymer above with filler is selected from inorganic salts or other organic solid powders those are compatible with different detergent formulation, most preferably sodium carbonate or sodium sulphate and alike.

In the above process for the manufacture of the modified organopolysiloxane based delay anti foam/defoamer composition the ratio of said selective silicone polymer and filler comprise 5-30 preferably 8-25:70-95 preferably 75-92 respectively.

Advantageously, the detergent composition/agent as above involving the delay defoamer composition/agent is found to have excellent antifoaming effect in rinsing cycle while preferred foaming effect in washing cycle.

The present invention thus relates to a process of making modified organopolysiloxane based delay defoamer compound/agent for detergent used as in situ in the detergent formulation where silicone compound generates preferred foaming properties of detergent in washing cycle but acts as defoamer in rinse cycle. In today's world, still hand washing is main way of cleaning cloths. It is also true that quality of detergent used for hand washing is accepted among the people where detergent quality is required to have desirable foam during washing. Cleaning chemicals used in the detergent are mainly anionic surfactants those having high foaming nature even at the presence of small quantity in water. During rinsing of cloths, people have a mind set up to wash the fabric till foam is not observed in the rinse water about a sense of ensuring the clothes free from dirt residues.

The delay silicone defoamer of the present invention in the detergent advantageously has a preferred amount of foaming in the washing time but act as defoamer in rinsing cycle. As a result, preferred amount of foam is observed after one wash and clothes appear clean after one rinse only. The present invention not only saves huge amount of waste water but also helps to preserve massive amount precious clean water in the world. Importantly, the present invention in other words is in the line of green water balance where the world is trying to reduce pollution and save the world from future massive climatic disasters.

The details of the invention, its nature and objects are explained hereunder in greater detail in relation to the following non-limiting examples.

EXAMPLES

Detergent Formulation-I

Comparison Example without Defoamer Compound of the Invention

Linear Alkyl benzene sulfonate Salt=10.00 part
Soap=1.25 part
Lauryl alcohol 7 EO=2.00 part
Sodium tripolyphosphate=26.40 part
Soda Ash=44.5 part
Sodium Sulphate=4.40 part
Enzyme Protease=0.40 part
Spekies Laundrosil=3.00 part
Tinapol CBS-X=0.40 part
Sod. Perborate=6.85 part
Tetra Acetyl Ethylene Diamine=0.5 part
Perfume=0.30 part

Example-1

Step-I
Polymer Synthesis

In the 10 lit reactor, transferred 5.5 Kg 80 cps α,ω hydroxyl terminated polydimethylsiloxane and 0.610 gm ester of adipic acid with diethylene glycol monobutyl ether having one carboxyl group free in one end and other end esterified with diethylene glycol monobutyl ether. Closed the reactor and purged with nitrogen for 30 min. Reactor was equipped with stirring, heating/cooling having vertical condenser that could use for stripping as well refluxing. Receiver was connected at the bottom of the condenser. Reactor also had a facility to work under nitrogen atmosphere or under vacuum or under pressure. An accurate temperature controlling system also installed in the reactor so that reaction could be carried out at desire temperature. After 30 min nitrogen purging, increased the reactor material temperature to 80° C. under nitrogen purging. Added 5 gm 50% active CsOH solution. Stopped nitrogen purging and applied 500 mm Hg vacuum. Increased reactor temperature to 170° C. under stirring and reaction was continued at 170° C. till acid carbonyl group converted to ester carbonyl. Carbonyl group detection was carried out with FTIR. When all acid carbonyl was converted to ester carbonyl group, vacuum was neutralized by nitrogen and added 5 gm silyl phosphate. Mixing was continued for 10 min under nitrogen purging. Stopped nitrogen purging and applied full vacuum. Increased temperature of the fluid to 200° C. Continued stripping till volatiles kept coming out from the fluid.

Cooled the fluid to room temperature under vacuum when stripping was over. A clear α,ω-di-acetoxy terminated organomodified polydimethyl siloxane was obtained.

Step-II
Defoamer Compound Formulation.

Took 850 gm sodium carbonate in a 2 lit mixer grinder. Added gradually 150 gm fluid synthesized in Step I of experiment 2 under running of mixer grinder. A free flowing 15% active antifoam powder was obtained.

Step-III
Detergent Formulation —II
Linear Alkyl benzene sulfonate Salt=10.00 part
Soap=1.25 part
Lauryl alcohol 7 EO=2.00 part
Sodium tripolyphosphate=26.40 part
Soda Ash=44.0 part
Sodium Sulphate=4.40 part
Enzyme Protease=0.40 part
Spekies Laundrosil=3.00 part
Tinapol CBS-X=0.40 part
Sod. Perborate=6.85 part
Tetra Acetyl Ethylene Diamine=0.5 part
Defoamer compound (Exp −1)=0.5 part
Perfume=0.30 part Step-IV
Performance Evaluation Protocol used for the evaluation of detergent in bucket by hand washing was as below
 a. used 15° fH hard water
 b. fabric to liquor ratio was 1:10
 c. used 4 gpl detergent (gpl=grams per liter)
 d. lathering was done for 20 sec
 e. washing cycle maintained 15 min or 30 min and measured lather height in every 5 min or 10 min intervals.
 f. squeezed fabrics at 50% weight pick up
 g. rinsing was done in each case in fresh 24° fH hard water in ratio of rinse water 1 part and 7 part fresh water and then 5 sec whisking; squeezed fabrics at 50% weight pick up and measured the foam height in bucket.

TABLE I

| Sample's name | detergent dosage, gpl | washing time, min | foam height during washing | | | | Foam height after $1^{st}$ rinse, cm | Foam height after $2^{nd}$ rinse, cm | Foam height after $3^{rd}$ rinse, cm | Foam height after $4^{th}$ rinse, cm |
|---|---|---|---|---|---|---|---|---|---|---|
| | | | 0 min | 5 min | 10 min | 15 min | | | | |
| Detergent I | 4 | 15 | 10.5 | 10.5 | 10 | 9 | 2 | 2 | 2 | 2 |
| Detergent II | 4 | 15 | 12 | 10 | 10 | 9 | 0.5 | 0 | 0 | 0 |

TABLE II

| Sample's name | detergent dosage, gpl | washing time, min | foam height during washing | | | | Foam height after 1st rinse, cm | Foam height after 2nd rinse, cm | Foam height after 3rd rinse, cm | Foam height after 4th rinse, cm |
|---|---|---|---|---|---|---|---|---|---|---|
| | | | 0 min | 10 min | 20 min | 30 min | | | | |
| Detergent I | 4 | 30 | 10.5 | 10 | 5 | 1.0 | 2 | 2 | 2 | 2 |
| Detergent II | 4 | 30 | 12 | 10 | 6 | 1.5 | 0.5 | 0 | 0 | 0 |

Above table showed the application result of the detergent produced in step III of experiment 1 clearly directed detergent II containing 0.5% invented delay defoamer performed extremely well in compare to conventional Detergent I in rinsing cycle and there was preferred foam height in detergent II compare to detergent I in washing cycle. The same is further illustrated by way of the accompanying FIG. 1. In comparison of detergent I and detergent II, effectiveness in detergent II was excellent according to the present invention.

From the table I and II, it is also cleared that delay defoamer powdered produced in experiment showed preferred foaming natures in washing cycle and at dilution stage of rinsing, reorientation of α,ω position of silicone chain took place. Silicone became free from capped terminal groups and acted as defoamer immediately. Since re-orientation is dependent on dilution, so preferred foam formation is not dependent of time of soaking in washing cycle which also confirmed by experiment as shown in table II where no such differences were observed in washing cycles with detergents having defoamer and without defoamer. Therefore, according to the present invention, modification of silicone molecule and use such modified molecules in detergent formulation is acceptable to all users globally with a consideration of different washing habit from one person to another person, from one region to another region, from one country to another country. Again, we observed from experiment, newly developed delay deformer compound according to present invention worked at 0.5% dosage which is obviously not effecting the cost of detergent formulation that most importantly helps detergent manufacturer to pass-on the benefits towards whole hand wash detergent users.

It is thus possible by way of the present invention to provide for detergent formulations and the like which would favour both the washing and rinsing cycles and make washing of clothes/fabrics more convenient and user friendly apart from taking care of avoiding unnecessary wastage of valuable water and saving the environment from unnecessary wastage of water in hand wash and/or semi automatic machine washing and the like.

The invention claimed is:

1. A modified silicone polymer comprising:
   a reaction product of hydroxyl/alkoxy ended organopolysiloxane and /or organocyclosiloxane or organopolysiloxane or mixtures thereof
   with a reactive organic compound comprising an alkylene group wherein one end of the alkylene group is capped with reactive groups selected from carboxylic group, carboxylic anhydride, epoxide and lactones
   and the other end of the alkylene group is linked directly with one side of a poly oxyalkylene chain via ether link or ester link and the other side of same poly oxyalkylene chain is capped with alkyl groups or aryl groups or alkyl aryl groups via ether link or ester link,
   wherein the alkyl group having 1 to 30 carbon atoms, preferably 1 to 10 carbon atoms, the aryl group having 6 to 35 carbon atoms, preferably 6 to 20 carbon atoms, the aryl group having 7 to 35 carbon atoms, preferably 7 to 20 carbon atoms,
   the alkylene group having 2 to 20 carbon atoms and most preferable alkylene groups are ethylene, propylene, butylene, pentylene and up to octylene groups with different isomeric forms,
   wherein in the poly oxyalkylene chain the alkylene groups may vary from ethylene to octylene group and also other form of isomers of said alkylene group and most preferable oxyalkylene groups are oxyethylene, oxy propylene, oxyisopropylene,
   and the number of the repeating unit of oxyalkylene groups may vary from 2 to 20 but most preferably from 2 to 5.

2. The modified silicone polymer as claimed in claim 1 wherein the oxyalkylene group comprises similar unit/s or mixture of different alkylene groups.

3. The modified silicone polymer as claimed in claims 1 comprising one or more of:

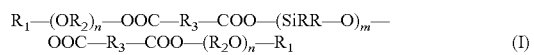

(I)

or

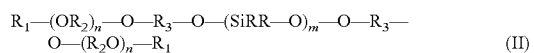

(II)

where R, $R_1$ can be alkyl group or aryl group or alkyl aryl group wherein the alkyl group having 1 to 30 carbon atoms; the aryl group having 6 to 35 carbon atoms; the aryl group having 7 to 35carbon atoms;
$R_2$ can be alkylene group having 2 to 8 carbon atoms;
$R_3$ can be alkylene group having 2 to 20 carbon atoms;
m, n are positive integers wherein n may vary from 2 to 20 and m may vary from 20 to 1000.

4. An organopolysiloxane anti foam composition comprising the
   modified silicone polymer as claimed in claim 1 and a carrier filler wherein the ratio of said silicone polymer and carrier filler comprises 5-30 : 70-95 respectively.

5. The organopolysiloxane anti-foam composition as claimed in claim 4 wherein the carrier filler comprises inorganic salts or organic solid powders compatible with different detergent formulations.

6. The organopolysiloxane anti foam composition as claimed in claim 4 wherein the ratio of said silicone polymer and carrier filler preferably comprises 8-25 : 92-75.

7. A detergent composition comprising the modified silicone polymer as claimed in claim 1, said composition comprising said modified silicone polymer incorporated in a standard detergent with a ratio of the modified silicone polymer : standard detergent in the range of 10-0.005 : 90-99.95.

8. A process for the manufacture of modified silicone polymer as claimed in claim 1 comprising:

reacting said hydroxyl / alkoxy ended organopolysiloxane and/or organocyclosiloxane or organopolysiloxane or mixture thereof with the reactive organic compound in the presence of an alkaline catalyst/an acid catalyst at 90° C. to 170° C. under vacuum and in the absence of silica;

neutralizing the polymer by silyl phosphate or with other acidic compounds in case of alkaline catalyst or with basic compound in case of acid catalyst to destroy effectiveness of the catalyst;

increasing the fluid temperature to in-between 140° C. to 200° C. under vacuum;

stripping out the volatiles content from the polymer; and finally cooling the polymer to room temperature free of the volatile contents.

9. The process as claimed in claim 8 wherein the alkaline catalyst comprises lithium, sodium, potassium, rubidium or cesium or quaternary compounds in form of oxide or hydroxide.

10. The process as claimed in claim 8 wherein the acid catalyst comprise halo acids or sulphuric acid or similar alike in the form acid itself or adsorb in any inert compound.

11. The process as claimed in claim 8 wherein 110° C. to 170° C. temperature is set to complete the reaction in-between silicone polymer and reactive organic compound and the fluid temperature is increased to in-between 150° C. to 200° C. to strip out volatile from the polymer.

12. The process as claimed in claim 8 wherein the ratio of the siloxane and the reactive organic compound vary from 99.0 : 1.0 to 80 : 20.

13. A process for the manufacture of the organopolysiloxane anti foam composition as claimed in claim 4 comprising:
(i) providing said modified silicone polymer
(ii) mixing the (i) modified silicone polymer above with filler selected from inorganic salt or other organic solid powders those are compatible with different detergent formulation.

14. The process for the manufacture of the organopolysiloxane anti foam composition as claimed in claim 13, wherein the ratio of said silicone polymer and filler comprises 5-30:70-95respectively.

15. The composition as claimed in claim 5 wherein inorganic salts are selected from the group consisting of sodium carbonate or sodium sulfate.

16. The detergent composition as claimed in claim 7, comprising said modified silicone polymer incorporated in a standard detergent with a ratio of the modified silicone polymer : standard detergent in the range of 4.0-0.1 : 96-99.9.

* * * * *